June 17, 1952  J. V. DRUM  2,600,740
WHEEL CHANGING DEVICE
Filed Sept. 4, 1947  3 Sheets-Sheet 1

INVENTOR.
John V. Drum.
BY
Harness, Dickey & Pierce
ATTORNEYS.

June 17, 1952  J. V. DRUM  2,600,740
WHEEL CHANGING DEVICE
Filed Sept. 4, 1947  3 Sheets-Sheet 2

INVENTOR.
John V. Drum.
BY
Harness, Dickey & Pierce
ATTORNEYS.

June 17, 1952  J. V. DRUM  2,600,740
WHEEL CHANGING DEVICE
Filed Sept. 4, 1947  3 Sheets-Sheet 3

INVENTOR.
John V. Drum.
BY
Barness, Dickey & Pierce.
ATTORNEYS.

Patented June 17, 1952

2,600,740

UNITED STATES PATENT OFFICE 2,600,740

WHEEL CHANGING DEVICE

John V. Drum, Ypsilanti, Mich., assignor to The Drum Corporation, a corporation of Michigan Application September 4, 1947, Serial No. 772,073

3 Claims. (Cl. 214—1)

The present invention relates to wheel handling devices.

One of the primary objects of the present invention is to provide novel wheel handling devices which facilitate the changing of vehicle wheels and tires.

A further object of the invention is to provide devices of the type mentioned by which large wheels, such as truck, trailer and tractor wheels, may be easily changed from the vehicle by one man.

A further object is to provide devices of the type mentioned which make it safe for one man to change large vehicle wheels.

A further object of the invention is to provide a unitary device whereby a vehicle may be positioned with one of the wheels in a movable wheel carrier, and the wheel removed away from the vehicle while the vehicle frame is raised, in a simple and effective way, without danger to the operator.

A further object of the invention is to provide a device of the type mentioned which is particularly adaptable for changing tractor wheels, and which is so constructed that the wheel may be easily removed from the vehicle by one man, turned and replaced for the usual purpose of varying the tread width.

A further object of the present invention is to provide improved devices of the type mentioned for handling different size wheels.

Other objects of the invention will become apparent from the following specification, from the drawings relating thereto, and from the claims hereinafter set forth.

In the drawings, in which like numerals are used to designate like parts in the several views throughout:

Heretofore, the changing of large vehicle wheels and tires, such as truck, trailer and tractor wheels, has been a difficult operation in that the wheels are so large and heavy that they are difficult to handle. It is particularly difficult for one man to effect a wheel change, and when it is attempted there is considerable danger of injury. According to the devices of the present invention, the weight of the wheel is supported in the wheel handling device, and with the vehicle frame raised, it is a relatively easy and safe operation for a single man to remove and change the vehicle wheel.

In farm tractors, it is one practice to reverse the position of the wheels on the tractor axle in order to vary the tread width. With one embodiment of the present invention, this change is very easily made in that the wheel is removed from the tractor axle, withdrawn away from the vehicle, rotated through 180°, and replaced on the axle. The weight of the wheel is supported at all times by the wheel handling device of the present invention so that the wheel may be easily maneuvered by the operator. In other types of farm tractors it is merely necessary to move the wheel away from the tractor, effect an adjustment, and return the wheel to its adjusted position without rotating it.

Figure 1:
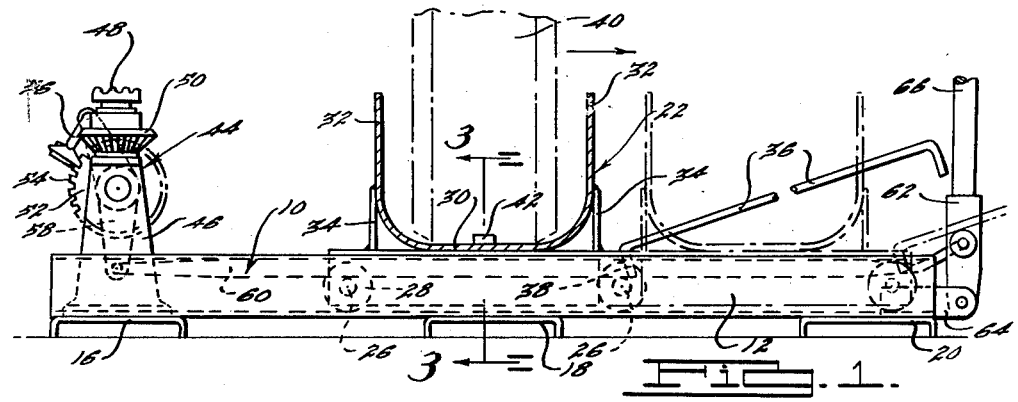
Figure 1 is a side elevational view of a wheel-changing device embodying features of the present invention.
Figure 2:
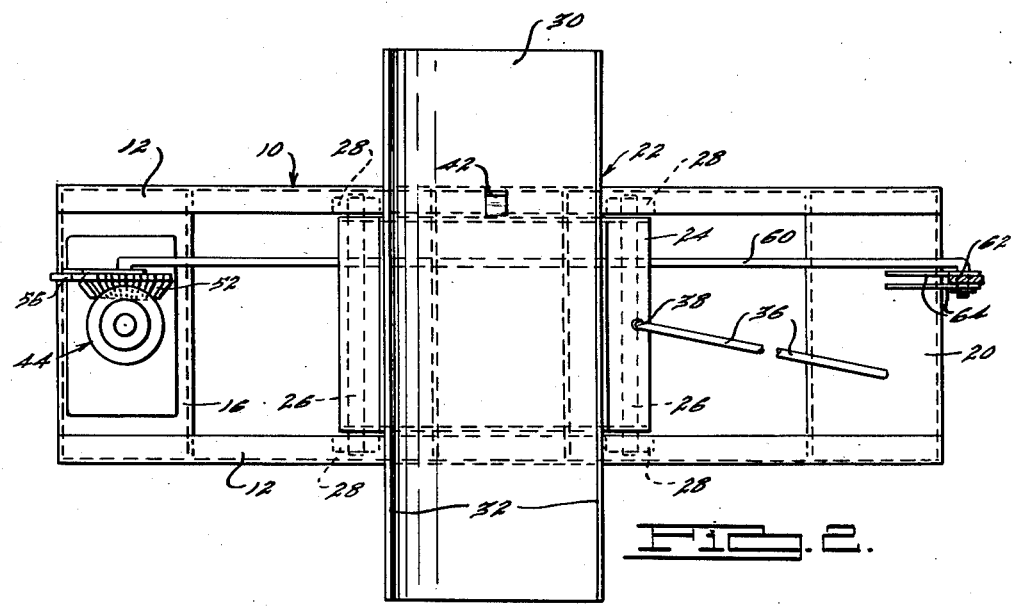
Fig. 2 is a top plan view of the structure shown in Fig. 1.
Figure 3:
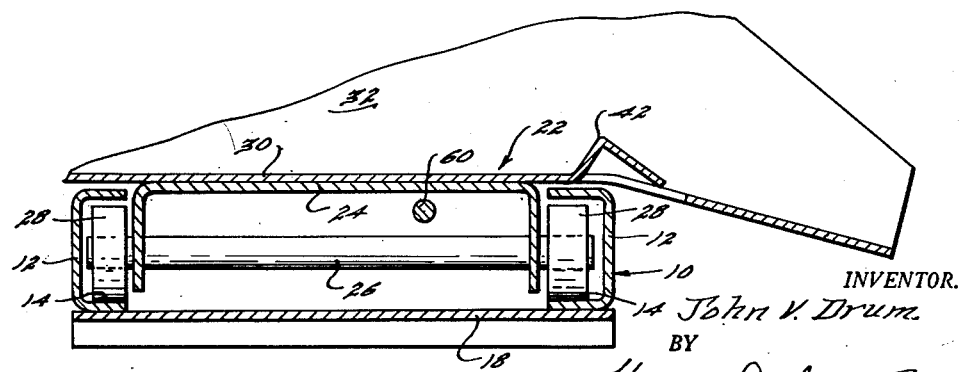
Fig. 3 is an enlarged, partial, cross-sectional view, taken substantially along the line 3—3 of Fig. 1.

Referring to the drawings, and referring particularly to Figs. 1-3 thereof, one embodiment of the present invention is illustrated. The wheel handling device comprises a ground engaging support or base, generally indicated at 10. The base 10 comprises a pair of facing side members 12 which are channel-shaped in cross-section and provide a pair of facing trackways 14. The side members 12 are suitably fixed in position by welding, for example, to longitudinally-spaced, transversely-extending, channel members 16, 18 and 20. The channel members 16 and 18 are disposed at opposite ends of the side members 12, with the member 18 in the center.

A wheel support, generally indicated at 22, is mounted on the base 10 for movement therealong. The wheel support comprises a carriage 24 which is in the form of a channel section having a pair of longitudinally-spaced, transversely-extending shafts 26 extending through aligned openings in the end thereof, and projecting beyond the sides. The shafts 26 have rollers 28 journaled on the ends thereof, and the rollers 28 are received within the trackways 14 for mounting the carriage 24 for movement along the ground support or base 10.

A wheel support 30, in the form of a saddle, open at its ends, and with upstanding sides 32, is secured to the top of the carriage 24 by welding, for example. The sides 32 may be braced by side plates 34 which are welded to the sides 32, and also welded to the top of the carriage 24. The saddle 30 extends transversely of the base 10; and the saddle 30 and together with the carriage 24 may be moved longitudinally of the base 10 by means of a pull rod 36. The pull rod 36 may have one end thereof bent, as indicated at 38, which may be positioned within an opening 38 in the outside edge of the carriage 24. The pull rod 36 is of such a length that an operator may conveniently hold it in one hand while standing up and balancing a wheel within the saddle 30.

In the drawings, a wheel 40, shown in broken lines, is positioned within the saddle 30, and a stop 42 is formed in the base of the saddle 30 as to assist in holding the wheel in position.

The wheel changing device of the present invention may also include as part of the unit a vehicle lifting jack. The jack per se may be of conventional construction, and may be either mechanically or hydraulically actuated. For purpose of illustration, a mechanical jack, generally indicated at 44, is fixed to the top surface of the base element 16 at one end of the base 10. The jack, as illustrated, comprises a base 46 having an axle supporting portion 48 which is mounted on a screw projecting downwardly into the base 46 within a lead nut, in the usual way. The nut may be turned by a bevel gear 50 which is mounted on the base, and which meshes with another bevel gear 52. The bevel gear 52 has ratchet teeth 54 formed in the periphery thereof which are adapted to be engaged by a ratchet 56. The ratchet 56 is pivotally connected to the upper end of a ratchet lever 58. The lower end of the ratchet lever 58 has one end of a push rod 60 pivotally connected thereto. The push rod 60 extends longitudinally of the base 10, under the top surface of the carriage 24, with the opposite end pivotally connected to an operating lever.

The jack actuating lever includes a socket 62 having the lower end thereof pivotally connected to a mounting bracket 64 which is mounted on the base 10. The actuating rod 60 is pivotally connected to the socket 42 at a point spaced from the point of pivotal connection of the socket with the bracket 64. An elongated actuating handle 66 may be positioned within the socket 62 when it is desired to operate the jack 44. It will be evident that by reciprocating the handle 66, the rod 60 would be reciprocated and the lever 58 rocked to engage the ratchet 56 with the ratchet teeth in on direction to raise the jack.

In the use of the device above described, when it is desired to change a vehicle wheel, the wheel changing device may be positioned so that the vehicle may be moved to place the wheel 60 within the saddle 30 in the position shown in broken lines in Fig. 1. As the wheel engages the leading edge of the saddle 30, the saddle will tilt to permit the wheel to run up the leading end. This is permitted, in the embodiment illustrated, by the clearance between the tops of the wheels 28 and the facing surfaces of the upper trackways. The jack 44 will then be in position under the axle and may be raised to lift the axle and support the vehicle. With the wheel 40 so positioned, it may then be unfastened from the axle and the operator may then pull the wheel away from the jack by moving the carriage 24 to the right, viewing Fig. 1. The wheel may then be rolled off the carriage and repaired, or another wheel re-positioned on the carriage and then moved back toward the axle and re-fastened thereto. It will be observed that in the use of this device, the operator is at all times to one side of the vehicle where he is not liable to injury and the weight of the wheel is supported on the carrier so that the wheel may be easily moved away from the vehicle. It is pointed out that an ordinary jack may be used rather than one forming part of the unit thereof. The combination here shown has advantages over the separate jack.

Figure 4:
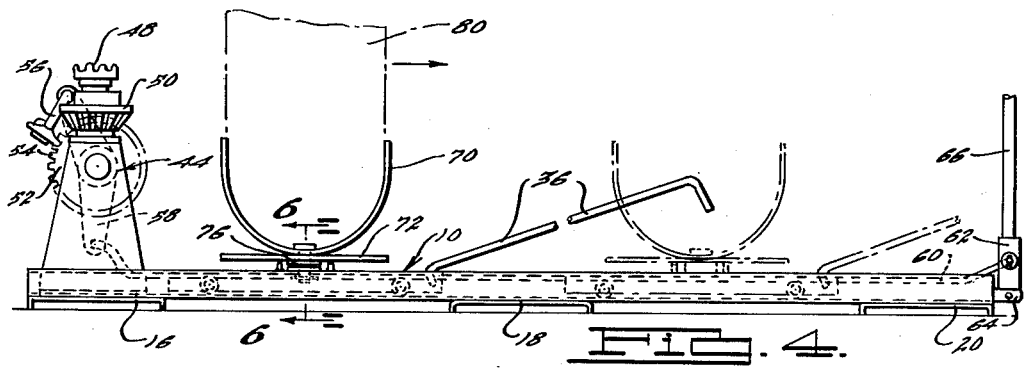
Fig. 4 is a side elevational view of a modified form of the present invention particularly adapted for tractor wheels.
Figure 5:
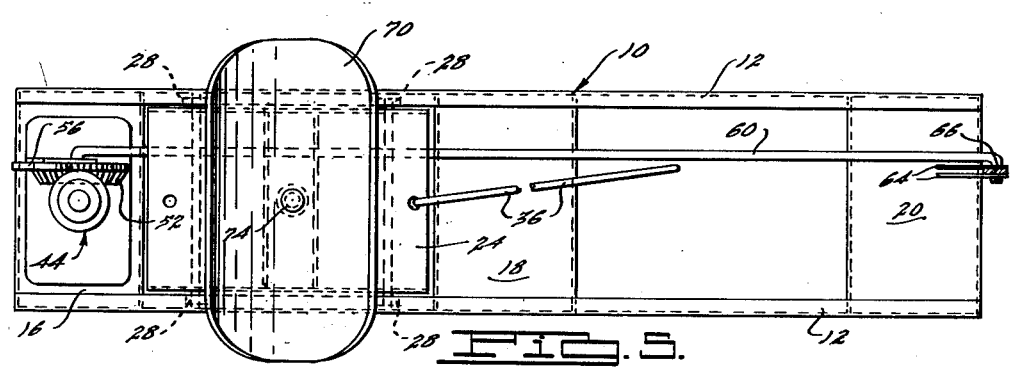
Fig. 5 is a top plan view of the structure shown in Fig. 1.
Figure 6:
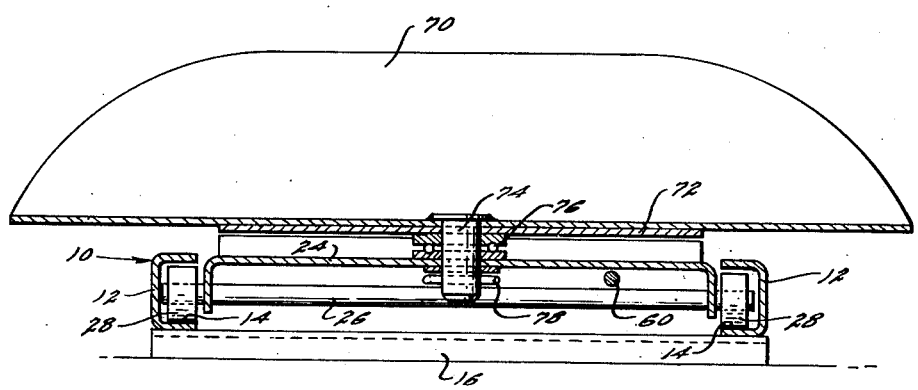
Fig. 6 is an enlarged, cross-sectional view taken substantially along the line 6—6 of Fig. 4.

Referring to Figs. 4–6, another embodiment of the invention is illustrated. This embodiment is particularly adapted for use in changing farm tractor wheels. As mentioned above, it is necessary in the use of such tractors to change the wheels by reversing their position on the tractor axle in order to have different tread widths. The device illustrated in Figs. 4–6 is generally the same as that shown in Figs. 1–3, except that the saddle is mounted for pivotal movement on the carrier. In this embodiment, a saddle 70 is fixed to an under plate 72 and has a depending pivot pin 74 mounted thereon. The pivot pin extends through openings in a ball bearing assembly 76, the upper race of which is fixed to the under side of plate 72, and the lower race being fixed to the top of carriage 24. The assembly is held in place by means of a suitable pin 78 projecting through an opening in the lower end of the pin 74.

In the use of this device, it will be appreciated that the tractor axle may be raised either by a separate jack, or by the jack 44. It is contemplated that the units of the present invention will be constructed both with and without the jack 44 as an element in the combination. With the tractor axle raised, the tractor wheel 80 is positioned within the saddle 70, and the carriage 24 moved away from the tractor to a position at the right, viewing Fig. 4. In this position, the wheel may be rotated 180°, the carriage 24 then moved back toward the tractor, and the wheel re-attached in its reversed position. It will be appreciated that this operation may be accomplished with speed and safety by one man.

Figure 7:
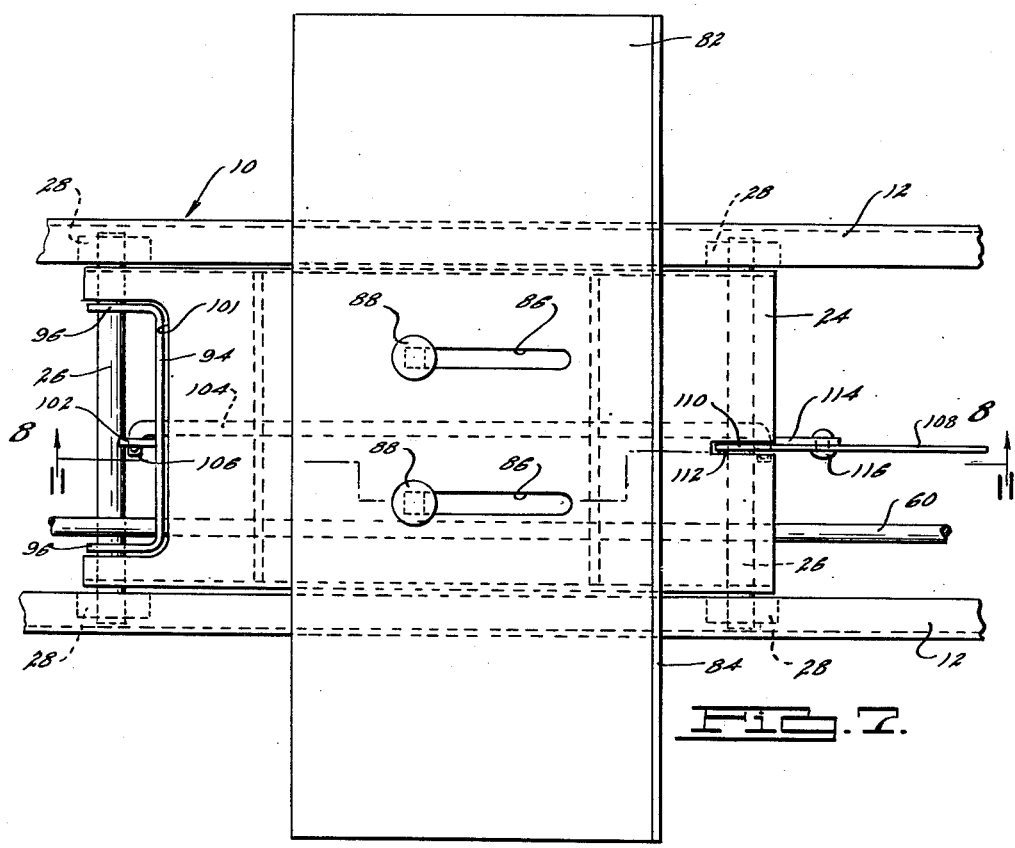
Fig. 7 is a partial top plan view similar to Fig. 2 and illustrating a modified form of the present invention.
Figure 8:
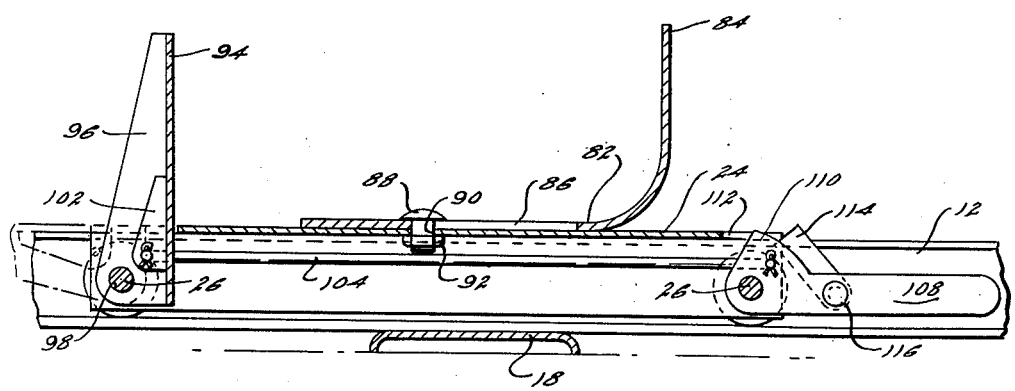
Fig. 8 is a cross-sectional view taken substantially along the line 8—8 of Fig. 7.

Referring to Figs. 7 and 8, another modified form of the present invention is illustrated in which the wheel-carrying device is adjustable for handling different size wheels, and in which the wheel may be clamped to the carriage. In this embodiment, the same numerals are used to designate like parts in Figs. 1 and 2. The wheel-engaging saddle is mounted on the carrier 24 and one side is formed by an elongated member 82 having a bottom portion, which is disposed upon the top surface of the carriage 24, and having an upstanding side 84. The member 82 is formed with a plurality of transversely-extending spaced slots 86 therein which receive bolts 88 therethrough. The bolts 88 pass through corresponding openings 90 formed in the top surface of the carriage 24 and are held in place by nuts 92. The heads of the bolts 88 overlap the sides of slots 86, and it will be evident that the member 82 may be adjustably fixed in position on the carriage 24.

The opposite side of the wheels is adapted to be engaged by a movable clamp 94. The clamp 94 has its side edges turned, as indicated at 96, and is provided with aligned openings 98 therethrough through which the axle 26 passes to pivotally support the member 94. The member 94 is received within a recess 101 formed in the adjacent edge of the carriage 24. The member 94 is pivoted on the shaft 26 by means of a back plate 102 which is fixed to the rear face of the plate 94. An actuating rod 104 has a bent end 106 which is received within an opening in the plate 102 and secured thereto by means of a cotter pin. The point of pivot connection of the rod 104 with the plate 102 is above and to one side of the shaft 106 so that by reciprocating the rod 104 the plate 94 is caused to pivot on shaft 26. The rod 104 is received within a slot formed through the bottom edge of the plate 94 so as to permit freedom of movement of the plate 94.

The opposite end of the actuating rod 104 is pivotally connected to an operating lever 108. The lever 108 is pivotally mounted on its adjacent shaft 26 and has a laterally offset portion 110 which is received within a slot 112 formed in the adjacent edge of the carriage 24. The point of pivotal connection of the rod 104 to the offset portion 110 is above and to one side of the shaft 26 so that as the handle 108 is moved in a counterclockwise direction, viewing Fig. 8, the plate 94 is caused to rotate in a corresponding counterclockwise direction to a horizontal and out-of-the-way position. In the position shown, the handle 108 is in its down, or horizontal, position and the clamping plate 94 in its upper wheel-engaging position. In order to lock the clamp 94 in that position, a detent 114 is pivotally connected to the handle 108 by means of a pivot 116. When the detent is dropped to the position shown, it engages under the adjacent edge of the carriage 24 so that the handle 108 cannot move inadvertently in a counterclockwise direction.

By adjusting the member 92 on the carriage 24 with respect to the clamp 94, wheels of varying width may be clamped to the carriage.

Formal changes may be made in the specific embodiments of the invention described without departing from the spirit and scope of the invention the scope of which is commensurate with the appended claims.

What is claimed is:

1. In a wheel handling device, an elongated base having a pair of oppositely disposed trackways, a carriage between said trackways, means supporting said carriage and disposed on said trackways to allow movement of the carriage along said base, a pivot mounting on said carriage, and a substantially U-shaped wheel support mounted on said pivot mounting and being of a length sufficient to extend beyond said trackways when transversely positioned, said pivot mounting allowing 180° rotation of said wheel support about a vertical axis, the pivot being positioned centrally of said wheel support, whereby a wheel on said wheel support may be reversed with respect to its axle.

2. In a wheel handling device, an elongated base having a pair of oppositely disposed trackways, each of said trackways comprising upper and lower guides, a carriage between said trackways, a plurality of rollers supporting said carriage and disposed between the upper and lower guides of said trackways, said carriage being movable along said base and being tiltable a limited distance in each direction as determined by the spacing between the rollers and said guides, a pivot mounting on said carriage, and a substantially U-shaped wheel support mounted on said pivot mounting and being of a length sufficient to extend beyond said trackways when transversely positioned, said pivot mounting allowing unrestricted rotation of said wheel support about a vertical axis, the pivot being positioned centrally of said wheel support, whereby a wheel on said wheel support may be reversed with respect to its axle.

3. In a wheel handling device, an elongated base having a pair of oppositely disposed trackways along said base, a carriage between said trackways, means supporting said carriage and disposed on said trackways to allow movement of the carriage along said base, a pivot mounting on said carriage, a substantially U-shaped wheel support mounted on said pivot axis and of a length sufficient to extend beyond said trackways when transversely positioned, said pivot mounting allowing 180° rotation of said wheel support about a vertical axis, the pivot being positioned centrally of said wheel support, whereby a wheel held by said wheel support may be reversed with respect to its axle, and thrust bearing means between said wheel support and said carriage.

JOHN V. DRUM.

REFERENCES CITED

The following references are of record in the file of this patent:

UNITED STATES PATENTS

| Number | Name | Date |
|---|---|---|
| 1,535,762 | Brejska | Apr. 28, 1925 |
| 1,555,152 | Passow | Sept. 29, 1925 |
| 1,847,382 | Collins | Mar. 1, 1932 |
| 2,232,744 | Thames | Feb. 25, 1941 |
| 2,365,771 | Olson | Dec. 26, 1944 |
| 2,379,587 | Moore | July 3, 1945 |
| 2,444,992 | Kittel | July 13, 1948 |
| 2,485,018 | Smith | Oct. 18, 1949 |